Sept. 10, 1935.  J. B. WHITTED  2,013,904
SHOCK ABSORBER
Filed Dec. 23, 1931    2 Sheets-Sheet 1
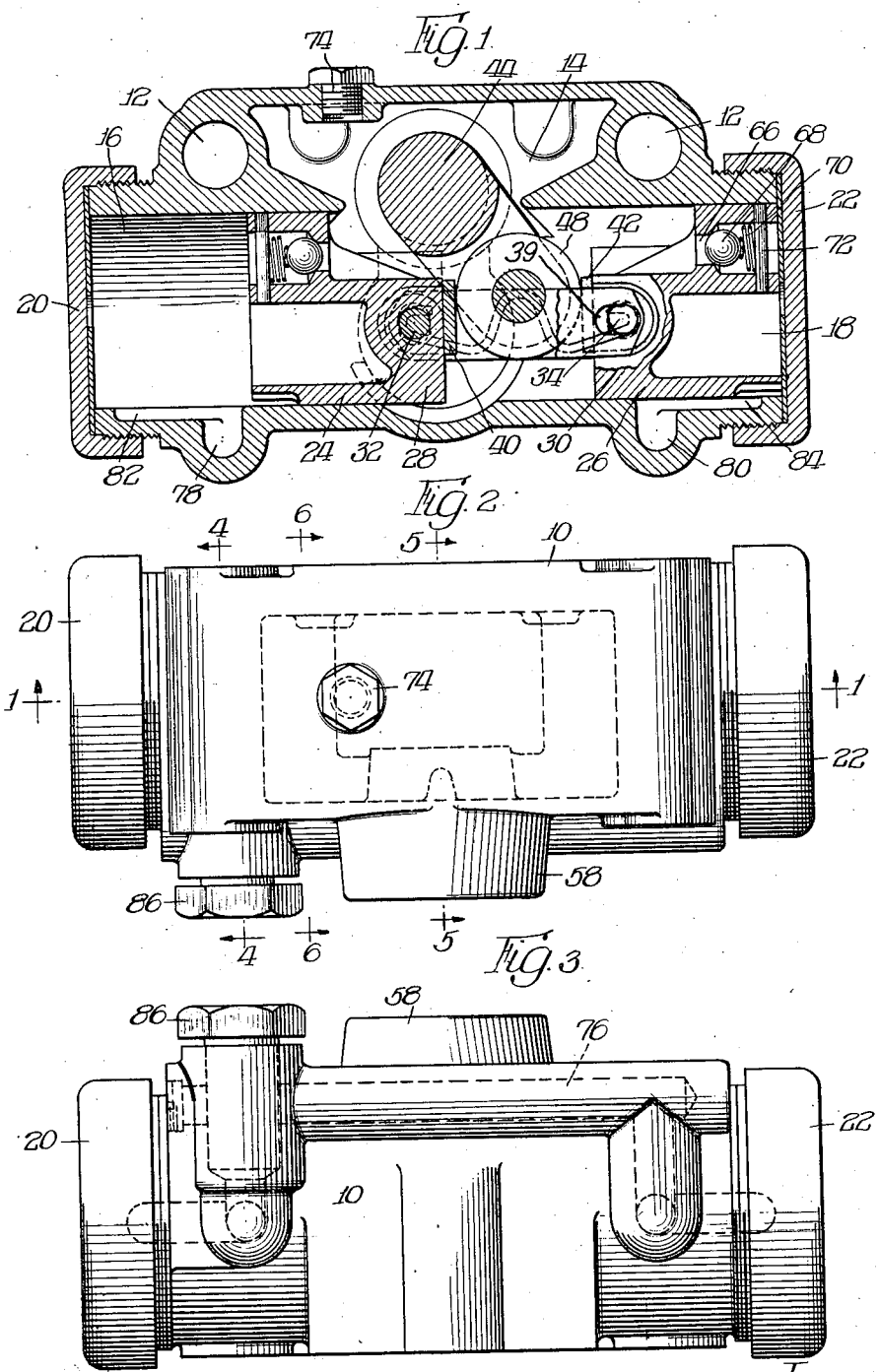
Inventor:
John B. Whitted, Sept. 10, 1935.  J. B. WHITTED  2,013,904
SHOCK ABSORBER
Filed Dec. 23, 1931  2 Sheets-Sheet 2
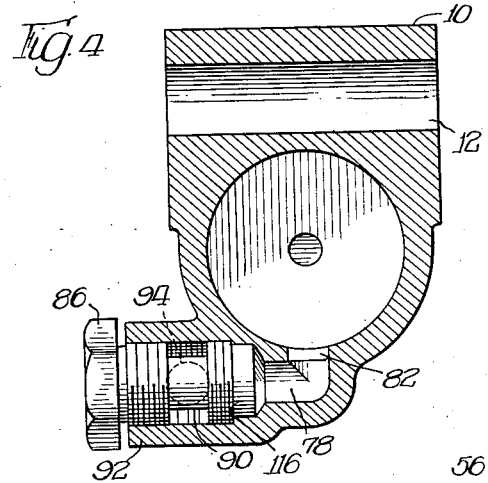
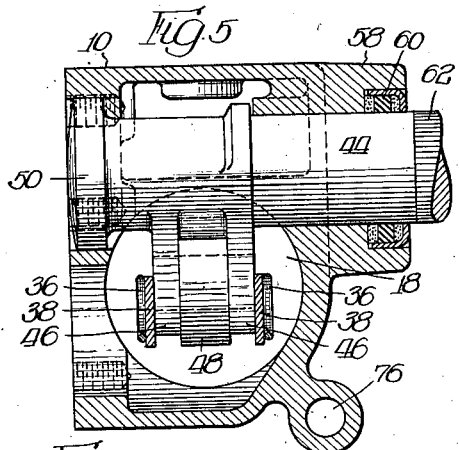
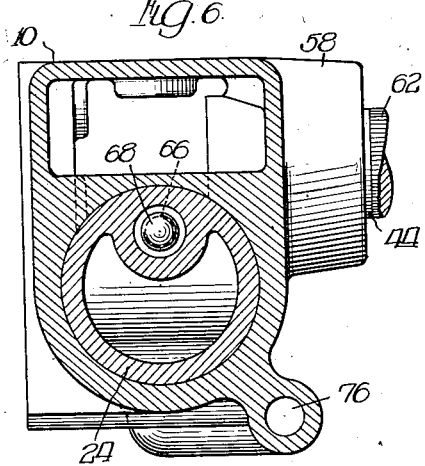
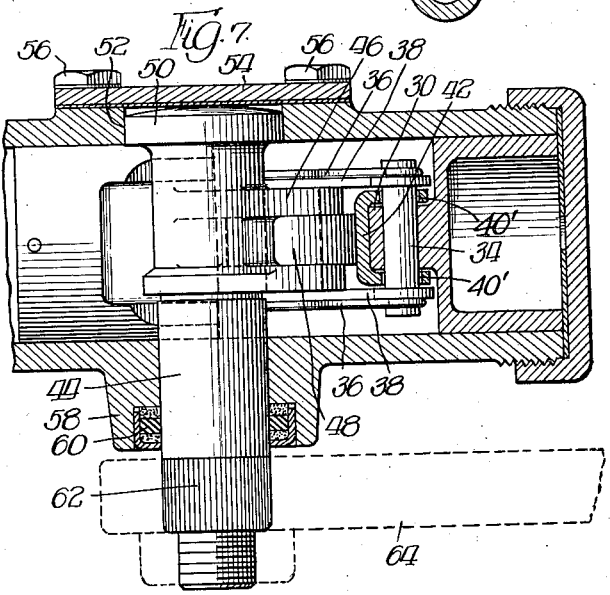
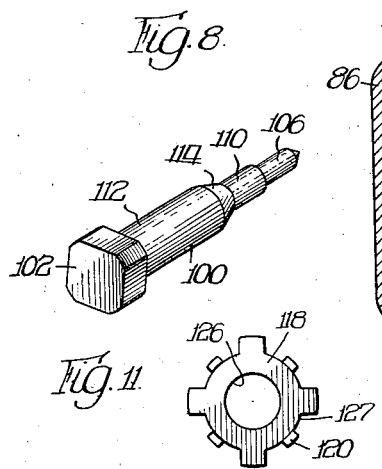
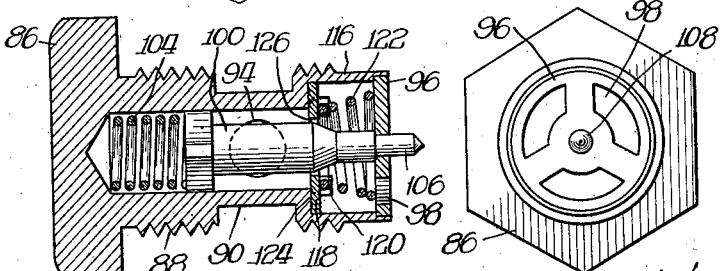
Inventor:
John B. Whitted, Patented Sept. 10, 1935

2,013,904

UNITED STATES PATENT OFFICE 2,013,904

SHOCK ABSORBER

John B. Whitted, Chicago, Ill., assignor, by mesne assignments, to Houde Engineering Corporation, Buffalo, N. Y., a corporation of New York Application December 23, 1931, Serial No. 582,686

11 Claims. (Cl. 188—88)

The present invention relates to improvements in shock absorbers, particularly double-acting hydraulic shock absorbers adapted to control both the bound and rebound movements of the vehicle springs whereby sudden jars and jolts are substantially eliminated.

The improvements are particularly directed to a double-acting shock absorber of the type including a double ended cylinder and a pair of pistons therein which are moved simultaneously in one direction or the other by a rock shaft connected to the axle or other part of the vehicle not supported by the springs, while the shock absorber itself is fixed to the chassis of the vehicle.

It is a feature of the invention to provide wear plates loosely connected to the pistons and maintained in contact with the rockable member through spring means resiliently connecting the pistons.

It is also a feature of the invention to provide guide plates loosely connected to the pistons and engaged by the rockable member to prevent rotation of the pistons.

A further feature of the present improvements relates to the construction of the fluid release valve adapted to establish restricted flow of the fluid through certain portions of the shock absorber in opposite directions, that is, both during the bound and rebound of the vehicle body.

Further and additional features and improvements of the present invention will be more readily apparent from the following description taken in connection with the attached drawings, in which Figure 1 is a vertical longitudinal section taken through the shock absorber on the plane indicated 1—1 in Fig. 2, a portion thereof being shown in elevation;

Figure 2 is a plan view of the shock absorber;

Figure 3 is a bottom view of the shock absorber;

Figure 4 is a vertical transverse section taken on the plane indicated 4—4 in Figure 2;

Figure 5 is a vertical transverse section taken on the plane indicated 5—5 in Figure 2;

Figure 6 is a vertical transverse section taken on the plane indicated 6—6 in Figure 2;

Figure 7 is a partial horizontal section taken longitudinally of the shock absorber;

Figure 8 is a perspective view of the fluid release valve stem;

Figure 9 is a longitudinal section of the fluid release valve stem and housing therefor;

Figure 10 is an end view of the fluid release valve and housing, and

Figure 11 is a plan view of the disk valve.

The shock absorber comprises a casing or housing 10 having apertures 12 extending therethrough for receiving bolts by means of which the shock absorber is attached to the vehicle. The housing 10 provides a central chamber 14 and cylindrical end chambers 16 and 18 closed by removable cap members 20 and 22 which are shown to be in screw-threaded engagement with the body of the housing 10. A pair of pistons 24 and 26 are provided slidable within the housing 10 and guided by the cylinder walls forming the end chambers 16 and 18. The pistons are provided with inwardly directed projections 28 and 30. Each of the pistons has a pin 32—34 passing through the projections thereof transverse to the axis of movement of the pistons. The pins are formed with grooved ends forming seats for connecting the pistons by means of a pair of springs 36. As clearly shown in Figure 1 the ends of the spring members 36 are hooked around the grooved ends of the pins 32—34. The pistons are also loosely connected by a pair of guide plates 38 which have slotted openings 39 at each end for receiving the ends of the pins 32—34. As will be noted in Figure 7 the guide plates 38 are inside of and retained in place by the springs.

Each of the pistons is further provided with a wear plate or shim 40 and 42, each bent in the form of a clevis to fit over the projections of the pistons and connected to the pins 32 and 34 by means of slots 40' permitting a certain degree of lost motion.

The pistons are operated by means of a rock shaft 44 rotatably supported by the shock absorber housing and provided with a laterally extending yoke portion 46 in which is rotatably supported a roller 48. It will be evident from the disclosure in Figure 1 that the yieldable connections between the pistons maintain the wear plates on each of the pistons in engagement with the roller and movement of the rock shaft will move the pistons together in either direction.

The rock shaft 44 is formed with a head 50 supported in a bearing portion 52 of the housing 10. The rock shaft is assembled through the figure 8 shaped opening 52, which is closed by the cover member 54 secured by bolts 56 to the housing 10. The rock shaft 44 extends through the bearing 58 of the housing 10 which is provided with sealing means 60 to prevent escape of the fluid from the shock absorber casing. The protruding end 62 of the rock shaft 44 may have connected thereto, in any suitable manner, an actuating arm 64 shown in dotted lines in Figure 7.

Each of the pistons is formed with a fluid passage 66 extending therethrough placing the central chamber 14 in communication with the end chambers 16 and 18. The flow of the fluid from the end chambers to the central chamber is prevented by a ball valve 68 held in normal seated position by a spring 70 retained by a cross pin 72. It will be noted that the housing 10 is provided with a plug 74 and by the removal of the plug the central chamber may be filled or replenished with fluid and the fluid from the central chamber 14 can flow past the ball valves 68 into the end chambers.

The end chambers 16 and 18 are placed in communication by passageway 76 extending longitudinally of the casing 10 and connected at its ends by transverse passageways 78 and 80 with the interior of the housing. The walls of the cylinder chambers 16 and 18 are suitably grooved as at 82 and 84 to permit flow to the extreme end of the chambers 16 and 18.

I have shown in Figures 4, 8, 9, and 10 the construction of the fluid release valve assembly which restrictively controls the flow of fluid between the opposite ends of the shock absorber. There is shown a plug 86 provided with screw threads 88 separated by an annular cut-out portion 90. The plug 86 is threaded into an extension 92 of the casing 10, as best shown in Figure 4. The fluid may flow in either direction through the valve seat within the body of the plug, as hereinafter described. Through an opening 94, the body of the plug is placed in communication with the annular cut-out portion 90 and therefore in communication with the longitudinal passageway 76. A disk member 96 is pressed into the inner end of the plug 86 and is provided with slotted openings 98. Slidably received within the body of the plug 86 is a valve stem 100, having a square-shaped head 102 for centering one end of the stem in the plug 86 and permitting flow of fluid past the head 102. The stem 100 is pressed in an inward direction by a spring 104 within the body of the plug 86 and reacting against the head 102 of the stem 100. The valve stem 100 has a reduced end 106 passing through a central opening 108 in the disk 96 and the shoulder of the enlarged portion 110 in normal position of the valve stem is pressed into engagement with the disk 96, as shown in Figure 9. The cylindrical portion 110 is smaller than the cylindrical portion 112 and these portions 110 and 112 are joined by a conical portion 114. Received within the enlarged inner end 116 of the plug 86 is a disk-shaped valve member 118 provided with inturned fingers 120 for centering the end of a spring 122 which normally urges the valve disk towards seated position upon shoulder 124. The valve disk 118 is provided with a central opening 126 slightly larger than the cylindrical portion 112 of the valve stem 100. The valve disk has cut-out portions 127 which permit flow around the edges of the disk when it is opened by the fluid pressure.

The shock absorber is secured to the vehicle body and mounted horizontally thereon for movement vertically with the vehicle body on bound and rebound of the same. The arm 64 is suitably connected by a link to the axle, or other portion of the vehicle structure which is not supported by the springs. When the vehicle strikes an obstruction or depression in the road, the body of the vehicle swings down towards the axle, compressing the springs and also moving the shock absorber secured thereto downwardly. This movement will cause the operating arm 64 to move in a counterclockwise direction thereby swinging the yoke member 46 to the right, in Figure 1, causing the horizontally disposed pistons to be simultaneously moved to the right. As the shock absorber is filled with oil, or other suitable fluid, as the pistons move to the right under the influence of the counterclockwise movement of the rock shaft, the fluid forward of the piston 26 will be forced through the channel 84, the cross bore 80, the longitudinal passageway 76 and into the chamber within the body of the housing plug 86 for the release valve assembly. The fluid being under compression will force the valve disk 118 from its seat against the resistance of the spring 122 and the movement of the disk valve relative to the tapering portion 114 of the valve pin effects a progressively increasing area of the opening in the disk valve to afford a variable restricted passage for flow of the fluid, plus additional flow around the edges of the valve disk. The amount that the opening increases is dependent, of course, upon the amount of pressure exerted upon the valve disk by the fluid and is in direct proportion to the force of the bound of the vehicle. The fluid thus forced through the aperture in the valve disk 118 passes through the apertures in the washer 96 through the cross bore 78, the channel 82 and into the chamber 16 to the rear of the left-hand piston 24.

After the vehicle body reaches the limit of its downward movement it starts upwardly on its rebound movement under the influence of the compressed springs of the vehicle. This upward movement causes the operating arm 64 to move in a clockwise direction and thereby moves the pistons in the opposite direction to that previously taking place. It will be understood that the fluid will act against the valve disk 118 to seat the same but will act against the valve pin 100 tending to move the pin against the resistance of the spring 104. The movement of the tapered portion 114 of the valve pin relative to the central opening of the valve disk 118 effects a progressively increasing area of the opening and here also the amount of the opening is dependent upon the amount of pressure exerted by the fluid upon the valve pin. As the vehicle body again returns toward its normal or neutral position, the compression of the fluid will not be sufficient to open the valve disk 118 since the slight enlargement of the central opening in the valve disk relative to the pin 100 will serve as a bleed to prevent any further retardation. It is to be understood that the up and down movements of the vehicle body, under ordinary road vibrations, are quite rapid so that the pistons will only move a few thousandths of an inch at the most and any displacement of fluid by the pistons during such slight movements passes the bleed opening of the valve disk 118 around the valve stem 100.

Due to the yieldable connection between the pistons, the wear plates carried thereby are maintained in constant engagement with the roller carried by the rock shaft and the guide plates engaging the sides of the yoke portion 46 of the rock shaft prevent rotation of the pistons with respect to the housing 10.

I claim:

1. In a shock absorber construction, a casing, a pair of pistons slidable in said casing, a rockable shaft supported by said casing, said shaft having an arm extending between said pistons, a roller carried by said arm between said pistons, a pair of guide plates loosely connecting said pistons, said roller being positioned between said guide plates, a pair of wear plates loosely carried by said pistons, each of said wear plates being interposed between one of the pistons and said roller and tension spring members connecting said pistons for yieldably holding each of said pistons in thrust engagement with said roller through the wear plates.

2. In a shock absorber construction, a casing, a longitudinal chamber in said casing, a pair of pistons slidable in said longitudinal chamber, a rockable shaft carried by said casing for moving said pistons simultaneously in either direction, resilient means connecting said pistons for holding said pistons in engagement with said rockable shaft, said casing having a fluid flow passage placing the ends of the longitudinal chamber in communication and pressure-operated valve members in said passage having a normally restricted opening therebetween, said valve members being adapted to open under pressure in either direction and provide an increasing area of opening for fluid flow between said valve members in accordance with an increasing fluid pressure in either direction.

3. In a shock absorber construction, a casing having a pair of end chambers adapted to contain fluid, piston means movable between said end chambers, a fluid flow passage connecting the end chambers independently of said pistons and valve means for controlling the flow of fluid through said passage in either direction comprising a pair of yieldably pressed valve members having a normally restricted flow opening therebetween and means providing an increasing area of opening for flow of the fluid between said valve members upon movement of either of said valve members away from its normal position.

4. A fluid flow controlling valve assembly for use in a shock absorber construction, comprising, a valve housing member, a pair of valve members in said housing, a pair of compression springs arranged to react between said housing and each of said valve members for holding said valve members in normal positions in abutment with said housing, one of said valve members being arranged to receive the other of said valve members and having an opening slightly larger than the other valve member, the other valve member being formed with a reduced portion whereby movement of either of said valve members from its normal position in accordance with the pressure of the fluid provides an increasing area of the fluid flow opening.

5. In a valve assembly for use in a shock absorber construction to control the flow of fluid in either direction, a valve housing member having a fluid flow chamber therein, said housing having an opening through a wall thereof in communication with said chamber, a valve stem member slidable in said chamber, a washer member having fluid flow openings carried by one end of said housing and slidably supporting one end of said valve stem member, a compression spring reacting between the inner end of said chamber and the head of said valve stem member to normally hold said valve stem member in abutting relation with said washer, a slidable disk valve carried within said housing having a circular opening to receive said valve stem member, a resilient spring reacting between said washer and said disk valve normally holding said disk valve in abutting relation with said housing, said valve members being pressed in opposite directions by said springs and said valve stem member having a conical portion normally extending beyond said disk valve, whereby movement of said valve stem member or of said disk valve by the pressure of the fluid provides an increasing area of opening for fluid flow between said valve members.

6. In a shock absorber construction, a casing, a pair of pistons slidable in said casing, a rockable shaft supported by said casing, said shaft having an arm extending between said pistons, a pair of guide plates loosely connecting said pistons, said arm extending between said guide plates to hold said pistons against rotation and contractible resilient elements connecting said pistons for holding said pistons in thrust engagement with said arm, said elements serving to retain said guide plates against displacement.

7. In a shock absorber construction, a casing, a pair of pistons slidable in said casing, a rockable shaft supported by said casing, said shaft having an arm extending between said pistons, a pair of pin members respectively carried by said pistons, a pair of guide plates having slotted openings at each end adapted to receive the ends of said pins for connecting said pistons, a pair of contractible resilient elements connected at their opposite ends to said pins to urge said pistons into thrust engagement with said arm and to hold said guide plates against displacement.

8. A fluid flow controlling valve assembly for use in a shock absorber construction comprising, a housing member, a pair of cooperating valve members in said housing providing a normal restricted opening for fluid flow between said valve members, resilient means acting upon said valve members in opposite directions to hold said valve members in normal positions in abutment upon said housing, one of said valve members having a tapered portion cooperating with the other of said valve members whereby when either of said valve members is moved from its normal position by the fluid pressure, an increasing area of opening is obtained for fluid flow between said valve members.

9. In a shock absorber construction, a casing, a pair of pistons slidable in said casing, a rockable shaft supported by said casing, said shaft having an arm extending between said pistons, a pair of guide plates loosely connecting said pistons, said arm extending between said guide plates, a pair of wear plates loosely carried by said pistons, each of said wear plates being interposed between one of the pistons and said arm, and resilient means connecting said pistons for yieldably holding each of said pistons in thrust engagement with said arm through the wear plates.

10. In a shock absorber construction, a casing, a pair of pistons slidably supported in said casing, a rockable shaft supported by said casing, said shaft having an arm extending between said pistons, a pair of cross pins carried by said pistons, a pair of wear plates, each of which is mounted by a cross pin on one of said pistons, a pair of guide plates loosely connecting the cross pins on said pistons and a pair of tension spring elements connecting the ends of said cross pins for yieldably holding said pistons in thrust engagement with said arm through the wear plates and for retaining said wear plates and guide plates in position.

11. A fluid flow controlling valve assembly for use in hydraulic shock absorber construction comprising a valve chamber having outer and inner end walls, an intermediate wall in said valve chamber having a port therethrough, a valve having a head and a stem, said head engaging in the inner end of said valve chamber to guide the inner end of said valve, said stem extending through said port but being separated therefrom to leave a passageway for normal fluid flow through said port, said stem at its outer end having guiding and abutting engagement against the inner end wall of said valve chamber, a spring tending to yieldably hold said valve in abutting engagement with said inner wall, said stem having an intermediate portion of varying cross section whereby when said valve is shifted by fluid pressure against resistance of said spring the flow area through said port will be changed.

JOHN B. WHITTED.